May 4, 1965 P. DURON 3,181,473
HIGH-PRESSURE, CAVITATION FREE PISTON PUMPS
Filed June 19, 1961 2 Sheets-Sheet 1

*INVENTOR.*
PAUL DURON
BY
*Lester S. Hecht*
ATTORNEY

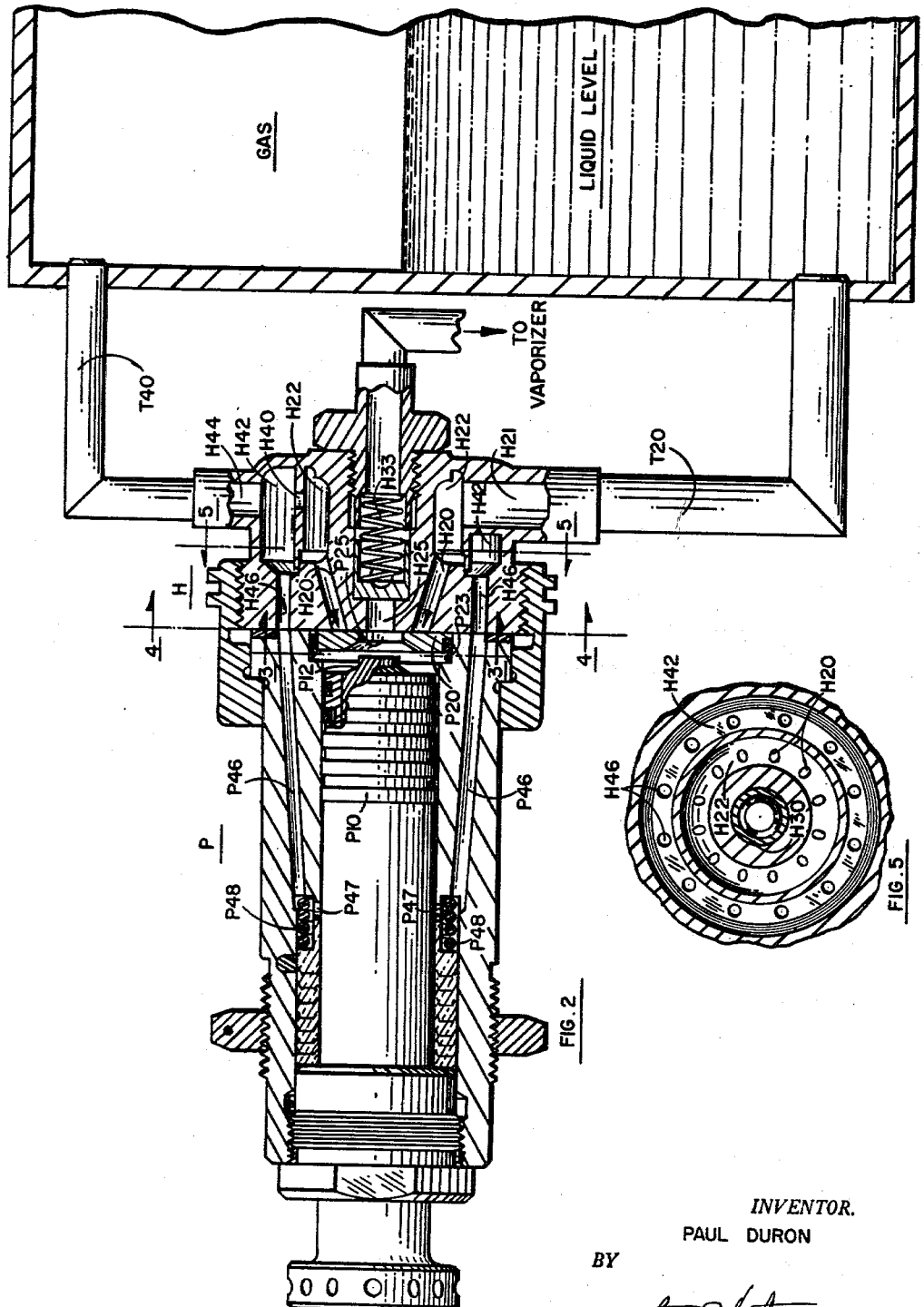

United States Patent Office 3,181,473
Patented May 4, 1965

3,181,473
HIGH-PRESSURE, CAVITATION FREE
PISTON PUMPS
Paul Duron, Anaheim, Calif., assignor, by mesne assignments, to Air Reduction Company, Incorporated, a corporation of New York
Filed June 19, 1961, Ser. No. 117,954
6 Claims. (Cl. 103—153)

This invention relates to various devices and means for accomplishing extremely high hydraulic pressures in a piston pumping system without causing any appreciable cavitation.

While many of the features of the invention described and claimed herein, such as the improved intake-discharge valve combination, will have general application, the principal stress in the following description will be placed upon the important contribution of the total combination for use in a cryogenic pump where extremely high pressures are desired in the order of 15,000 pounds per square inch. It will be understood, of course, that this principal stress is designed only to exemplify the importance of the novel features of the invention and is not intended, in any way, to limit these novel features to this particular area of application. This is particularly true with regard to the novel concentric intake-discharge valve and port arrangement which make it possible to force about 99.9% of all liquid in the piston compression chamber out through the discharge valve. Such a feature is especially useful in the particular problem area which will be discussed in detail below, but will find frequent usage for other types of pumps where this degree of discharge is desired.

The cavitation problem is a critical one where cryogenic fluid must be pumped, and especially so where the pressures desired are of the order of magnitude mentioned above. The three general areas where such cavitation may occur are (1) during the intake cycle as fluid is expanded as it is drawn into the piston chamber; (2) during the compression cycle due to the so-called "blow-by" fluid which passes through the piston rings; and (3) during the exhaust cycle as the compressed fluid tends to expand, and especially where the exhaust or intake valves require some volume of space in the piston chamber which cannot be forced out during the discharge cycle. It may be noted here that the terms exhaust and discharge will be used interchangeably throughout this specification and claims.

It is the principal object of the present invention to accomplish all of the necessary anti-cavitation measures required to minimize or completely avoid introducing vapor or gases into the piston chamber during the intake cycle, to minimize or avoid retention of gases in the chamber due to the piston blow-by effect, and to minimize or avoid any residual gases which tend to remain in the chamber after the compression cycle.

Another object of the invention is to provide a piston and intake-discharge valve configuration which permits the discharge cycle to dispose of about 99.9% of all fluid in the piston chamber.

A further object of the invention is to provide intake venting means for removing vapor or gas from fluid drawn into the piston chamber during the intake cycle.

Still another object is to provide blow-by gas or vapor venting means for removing gas or vapor caused by the expansion of fluid through the piston rings or packing.

Yet a further object of the invention is to provide an improved concentric intake-discharge valve arrangement which is compact and shaped to receive the piston configuration for virtual 100% exhaustion of the piston chamber.

The novel features which are believed to be characteristic of the invention, both as to its organization and method of operation, together with further objects and advantages thereof will be better understood from the following description considered in connection with the accompanying drawings. It is to be expressly understood, however, that the drawings are for the purpose of illustration and description only and are not intended as a definition of the limits of the invention.

FIG. 2 is an expanded section through the system of FIG. 1, showing the sectional details of the various improved features of the invention;

Figure 3:
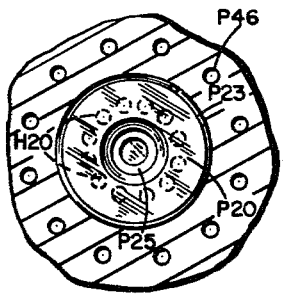
Figure 4:
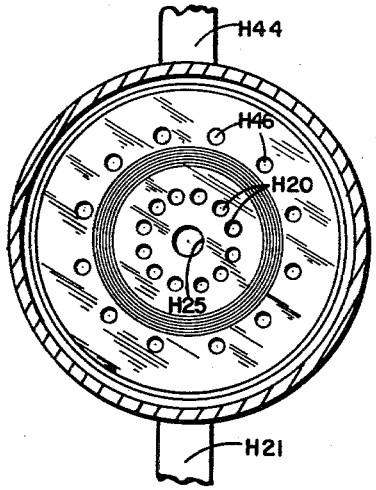
Figure 6:
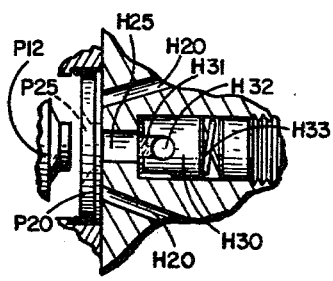

FIG. 3, taken along line 3—3 of FIG. 2, shows the manner in which the intake valve sits on the intake ports;

FIG. 4, taken along line 4—4 of FIG. 2, shows the face of the valve head which includes the concentric intake and discharge ports as well as the blow-by gas ports;

FIG. 5, taken along line 5—5 of FIG. 2, is an internal section of the head and shows the annular rings within the head which provide several paths for gas and vapor removal; and FIG. 6 is an expanded view of the piston-intake-discharge configuration which makes it possible, according to the invention, to accomplish virtual complete exhaustion of the piston chamber.

Figure 1:
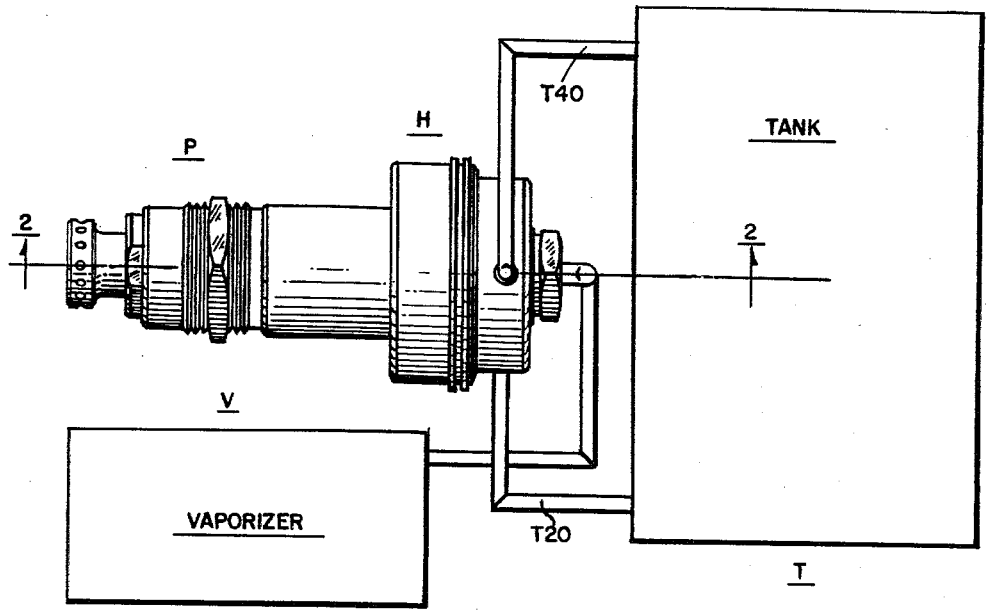
FIG. 1 shows a vaporizing system for pumping cryogenic liquid, using the piston and valve head configurations of the invention.

Reference is now made to FIG. 1 where the general form of a system incorporating the various features of the invention is shown. The four principal parts of this system are: a tank, referenced as T, for storing the cryogenic liquid and the gas; a vaporizer, referenced as V, which receives the pressurized output fluid; and the inventive combination of a piston and associated structure, referenced as P, and a valve head with associated ports and vents, referenced as H.

As a convenient referencing method herein, all parts which are associated with each of the four principal parts above will be referenced by a prefix letter indicating such correspondence. Thus the piston itself is referenced as P10, the intake valve which sits on the piston side is referenced as P20, and the intake ports which form part of the head are referenced as H20. An attempt is also made to show correspondence between various ports and valves. Thus, the number 20 was used for both intake valve and ports, with the prefix letter providing the required distinction in reference.

The detailed features which constitute the total combination of the invention will now be described with reference to FIG. 2. Fluid drawn from tank T passes through an intake tube T20, through an intake chamber H21, in head H, then through an expanding volume annular ring chamber H22 which is concentric with the center axis along line 2—2 of FIG. 1, and finally through ports H20 to the entrance points which are blocked by intake valve P20 during the compression cycle.

Valve P20 is forced against the port openings for ports H20 by a suitable helical spring P23. During the intake cycle, piston P10 is drawn away from the intake valve, compressing spring P23 and then drawing fluid through the intake ports into the piston chamber.

An important feature of the invention to note at this point is that the end P12 of piston P10 is shaped to exactly match the bore P25 which is made in the intake valve P20 so that during the compression cycle, the piston end is forced into the bore of the intake valve which constitutes the port for the discharge valve discussed below.

This arrangement is shown in expanded detail in FIG. 6 where the poppet-valve H30 for discharge is also shown. The poppet valve H30 is forced against the discharge port bore P25 by means of a suitable helical spring H33. Valve H30 has a flat portion at its end which is forced against port P25 by spring H33 to close the discharge valve but also has grooves H31 and poppet ports H32 which provide the means for discharge of fluid around the flat port-closing end of the poppet and into grooves H31 and ports H32 during the discharge cycle.

It is the combination of the protruding portion P12 of the piston, the matching bore P25, and the concentric arrangement of grooved poppet valve H30 with the disc-like multiple port controlling intake valve P20, which makes it possible to achieve almost perfect exhaustion from the piston chamber during the discharge cycle.

Referring again to FIG. 2, it will be noted that a port H40 extends from the upper portion of annular chamber H22 into a second chamber H42. This permits gas or vapor to be removed from the intake through chamber H21 and around the annular chamber H22; being then passed into gas exit chamber H44 and thence through exit pipe T40 into the gas containing upper portion of tank T.

Chamber H42 is partly annular to provide a second gas outlet with ports P46 which are arranged to receive the so-called blow-by gas which expands around the piston P10. This gas passes through one of the gas exit ports P47 which enable a passage through packing springs P48.

During the compression cycle, then, gas may seep around piston P10 and along the inner walls of the piston chamber, and be released through ports P46 and through the annular portion of chamber H42 to be finally released through chamber H44 and pipe T40.

The novel concentric arrangement of all ports and valves according to the invention is further depicted in FIGS. 3, 4 and 5. FIG. 3 is a view looking back toward head H starting at the surface of valve P20. Thus the circumference of this valve is shown in a solid line and the ports H20 which are closed by this valve are shown in dotted lines. The bore P25 which leads to the poppet valve H30 appears with solid lines since this is visible from the view of FIG. 3. Ports P46 are also visible from this view.

FIG. 4 is taken at the surface of head H and thus shows the various ports mentioned above as solid lines. It will be noted that discharge bore or port H25 has a head reference letter to correspond to bore P25. The surface of the head H and the inner surface of valve P20 are lapped to provide a clean valve cut off action.

FIG. 5 is taken through the annular portions of chambers H22 and H42 looking toward the piston chamber and thus show the annular portions in solid lines.

From the foregoing description it should now be apparent that the present invention provides various devices for accomplishing the extremely high percentage evacuation of a piston chamber with resulting high pressure with a minimum or zero cavitation. The high percentage evacuation is accomplished through the cooperation of a piston end configuration which is shaped to match the bore through the intake valve, which itself is arranged in a novel manner to be concentric with the discharge poppet valve in the head.

The provision of expansion chamber H22 and port means for drawing off intake gases insures that the intake cycle will draw only liquid into the piston chamber through ports H20, after being drawn around and through intake valve P20.

The provision of ports P46 for drawing off blow-by gases which are then passed through corresponding head ports H46 and thence through the annular portion of chamber H42, chamber H44 and pipe T40 to tank T, insures that gases do not remain behind the piston after the compression cycle. Such passage of gas also serves to cool the piston to reduce the temperature of the liquid which is later drawn into the chamber.

The concentric arrangement of the intake and discharge valves has a further advantage beyond those discussed above in that this discharge serves to cool the intake valve somewhat to aid in the prevention of cavitation during the intake cycle.

It has been pointed out that the exemplary embodiment arranged for handling cryogenic liquids is only one form of use of the various features of the invention. The novel arrangement of concentric intake and discharge valves with matching piston end will find general application wherever it is desired to accomplish a high degree of evacuation from a piston chamber.

Accordingly, it will be understood that the scope of the invention is to be construed only by reference to the appended claims since the description herein covers features with an extremely broad range of equivalents.

I claim:

1. In a system including: a tank for storing liquid in a bottom portion and gas in an upper portion, a piston chamber and piston, a head providing a plurality of fluid intake ports and a fluid discharge port for said piston chamber, a fluid intake pipe connecting said bottom portion of said tank with said plurality of fluid intake ports, a vaporizer, and a fluid discharge pipe connecting said fluid discharge port to said vaporizer; the improvements comprising: an annular gas vapor removal chamber interposed between said intake pipe and said fluid intake ports to provide for expansion in the liquid drawn into said piston chamber and thereby to remove gas from said fluid to prevent entry of such gas into said piston chamber; a gas exit port connected to said annular gas vapor removal chamber; a gas exit chamber and a gas exit pipe connecting said gas exit port to said upper portion of said tank; means within said piston chamber including gas discharge ports connecting said piston chamber to said gas exit chamber to remove gas caused by blow-by during the compression cycle within said piston chamber; and a concentric intake-discharge valve arrangement including a central discharge valve and a disc-like concentric intake valve arranged to sit at the periphery of said piston chamber during the intake cycles, whereupon fluid is drawn through said plurality of intake ports, said intake valve having a center passage therethrough to provide for the passage of fluid under compression to said discharge valve said discharge valve being arranged to inhibit fluid flow into said piston chamber during intake cycles and to permit passage of compressed fluid into said vaporizer during discharge cycles.

2. A minimum cavitation arrangement for a piston pump comprising: a piston chamber and piston within; a head; an annular gas removal chamber within said head; a fluid intake pipe for conducting fluid to said piston chamber; means connecting said fluid intake pipe to said annular gas removal chamber providing for expansion of said fluid to permit gas escape into said chamber; means connected to said annular chamber for removing gas therefrom to a gas storage tank; and means connected to said piston chamber for removing blow-by gas created during compression to pass such gas through said last-named means to said gas storage tank.

3. In a piston pump cylinder head, an improved intake-discharge valve arrangement comprising: a plurality of intake ports through the pump cylinder head; a moveable floating disc-like intake valve, with a center passage therethrough, arranged to control fluid passage through said plurality of intake ports said plurality of intake ports being concentric with said center passage and contiguous thereto; and a poppet-type discharge valve having an end portion for cutting off fluid flow through said intake valve center passage, and a plurality of grooves for passing fluid under compression around the end portion of said discharge valve and thence through an axial passage portion therein said grooves being the only discharge path for fluid compressed around the end portion of said discharge valve.

4. The improved feature in a piston pump for cryogenic fluids having a piston chamber including a head, an intake expansion chamber, an annular gas discharge chamber and an intake of a plurality of blow-by ports arranged around the piston chamber for passage of gases to the annular gas discharge chamber in the piston chamber head, and said intake expansion chamber being arranged to be contiguous to the piston chamber intake.

5. The improved feature in a piston pump for cyrogenic fluids having a piston chamber including a piston chamber intake and a piston chamber head having an annular gas discharge chamber of an intake expansion chamber in fluid communication with the annular gas discharge chamber to remove gaseous vapors before the intake cycle.

6. A head for a piston pump comprising: a head core composed of thermally conductive material, a central discharge port in said core; a plurality of intake ports in said core surrounding said central discharge port; and a second plurality of ports for providing blow-by gas removal surrounding said central discharge port and contiguous to said first plurality of intake ports.

References Cited by the Examiner

UNITED STATES PATENTS

| | | | |
|---|---|---|---|
| 1,290,803 | 1/19 | Thoens | 103—203 |
| 1,512,066 | 10/24 | Taylor | 251—325 |
| 1,632,262 | 6/27 | Aikman | 230—238 |
| 1,719,572 | 7/29 | Stoll | 230—231 |
| 2,025,240 | 12/35 | Higham | 230—231 |
| 2,118,234 | 5/38 | Rupp | 103—203 |
| 2,251,664 | 8/41 | Davis | 103—203 |
| 2,785,639 | 3/57 | Huber | 103—203 X |
| 2,888,879 | 6/59 | Gaarder | 103—153 |
| 2,928,424 | 3/60 | Horton et al. | 251—325 |

FOREIGN PATENTS 880,453  3/43  France.

LAURENCE V. EFNER, *Primary Examiner.*

ROBERT M. WALKER, JOSEPH H. BRANSON, JR.,
*Examiners.*